United States Patent [19]
Bauer et al.

[11] Patent Number: 5,385,967
[45] Date of Patent: Jan. 31, 1995

[54] USE OF AQUEOUS DISPERSIONS AS HEAT-SEAL ADHESIVES

[75] Inventors: Gerhard Bauer, Weinheim; Karl-Heinz Schumacher, Neustadt; Hans-Joachim Fricke, Dirmstein; Eckehardt Wistuba, Bad Durkheim; Hans J. Neumann, Wachenheim, all of Germany

[73] Assignee: BASF Aktiengesellschaft, Ludwigshafen, Germany

[21] Appl. No.: 70,971

[22] Filed: Jun. 4, 1993

[30] Foreign Application Priority Data

Jun. 16, 1992 [DE] Germany ............... 4219651

[51] Int. Cl.$^6$ ........................................... C08C 37/00
[52] U.S. Cl. ................... 524/458; 524/460; 524/517; 427/385.5
[58] Field of Search ............ 524/517, 460, 458; 427/385.5

[56] References Cited

U.S. PATENT DOCUMENTS 4,931,494  6/1990  Auchter et al. .............. 524/460

FOREIGN PATENT DOCUMENTS 3921256  1/1991  Germany.
3930743  3/1991  Germany.

Primary Examiner—Joseph L. Schofer
Assistant Examiner—Jeffrey T. Smith
Attorney, Agent, or Firm—Oblon, Spivak, McClelland, Maier & Neustadt

[57] ABSTRACT

An aqueous dispersion containing from 5 to 80% by weight of a copolymer A) having a glass transition temperature of from 50 to 150° C. and from 95 to 20% by weight of a copolymer B) having a glass transition temperature of from −50° to +50° C., the glass transition temperatures of the two copolymers differing by at least 20° C. at least one of the two copolymers containing from 3 to 70% by weight, based on the particular copolymer, of an ethylenically unsaturated $C_3$–$C_5$-mono- or dicarboxylic acid or of the anhydride thereof and the stated weights of the copolymers A) and B) being based on the sum of A) and B), is used as a sealable coating.

3 Claims, No Drawings

USE OF AQUEOUS DISPERSIONS AS HEAT-SEAL ADHESIVES

The present invention relates to the use of an aqueous dispersion containing from 5 to 80% by weight of a copolymer A) having a glass transition temperature of from 50° to 150° C. and from 95 to 20% by weight of a copolymer B) having a glass transition temperature of from −50° to +50° C., the glass transition temperatures of the two copolymers differing by at least 5° C., at least one of the two copolymers containing from 3 to 70% by weight, based on the particular copolymer, of an ethylenically unsaturated $C_3$–$C_5$-mono- or dicarboxylic acid or of the anhydride thereof and the stated weights of the copolymers A) and B) being based on the sum of A) and B), for sealable coatings.

Copolymers for sealable coatings, including heat-seal adhesives or coatings, are polymers which are suitable for the adhesive bonding of, for example, boxboards and plastics films at high temperature. Heat-seal adhesives are useful, for example, for the production of packaging. For this purpose, the heat-seal adhesive is applied to a sheet-like substrate, for example a boxboard, and the material to be packaged is subsequently enclosed by heat-sealing the boxboard at high temperatures with a plastics film deep-drawn according to the shape of the packaged article.

Since the coating of the substrate and the adhesive bonding are carried out in different operations, heat-seal adhesives must in some cases meet contradictory requirements.

The coated substrates or boxboards must be capable of being stacked without sticking together (blocking resistance).

The heat-seal adhesives should therefore be non-tacky at conventional storage temperatures (up to 40° C.).

In the case of heat sealing, however, it is desirable that the temperatures required are not too high and the resulting adhesive bonds exhibit high strength (good heat sealability).

The requirements for good blocking resistance and good heat sealability are not sufficiently met by conventional heat-seal adhesives, as disclosed, for example, in DE-A-3 930 743 and DE-A-3 921 256.

DE-A-3 921 256 describes aqueous dispersions which contain a mixture of two copolymers. These copolymers are prepared by solution polymerization and subsequent dispersing in water.

It is an object of the present invention to provide sealable coatings which have both good blocking resistance and heat sealability.

We have found that this object is achieved by the use described above.

The aqueous dispersion for use as a sealable coating contains from 5 to 80, preferably from 10 to 70, particularly preferably from 15 to 50, % by weight of the copolymer A) and from 95 to 20, preferably from 90 to 30, particularly preferably from 85 to 50, % by weight of the copolymer B), the percentages in each case being based on the sum of the copolymers A) and B).

The glass transition temperature of A) is from 50° to 150° C., preferably from 70° to 120° C., and that of B) is from −50° to +50° C., preferably from −25° to +25° C.

The glass transition temperature of the copolymer can be determined by conventional methods, such as differential thermal analysis or differential scanning calorimetry (cf. for example ASTM 3418/82, i.e. midpoint temperature).

The copolymers preferably contain main monomers a) which are esters of acrylic or methacrylic acid of alkyl alcohols of 1 to 20, preferably 1 to 8, carbon atoms or $C_8$–$C_{12}$-vinylaromatic compounds.

Particular examples are methyl (meth)acrylate, ethyl (meth)acrylate, propyl (meth)acrylate, n-butyl (meth)acrylate or 2-ethylhexyl (meth)acrylate, and vinylaromatics, such as vinyltoluene, o- and p-styrene and preferably styrene.

Examples of further suitable main monomers a) are vinyl esters of carboxylic acids of 1 to 20 carbon atoms, such as vinyl laurate, vinyl stearate, vinyl propionate and vinyl acetate, and ethylenically unsaturated nitriles, such as acrylonitrile and methacrylonitrile.

In particular mixtures of these main monomers a) are used, resulting in the particular glass transition temperature desired.

In addition to the main monomers a), auxiliary monomers b) may also be used. Examples of suitable auxiliary monomers are vinyl halides, preferably vinyl chloride and vinylidene chloride, nonaromatic hydrocarbons having 2 to 8 carbon atoms and at least 2 olefinic double bonds, e.g. butadiene, isoprene or chloroprene, and esters of acrylic and methacrylic acid with alcohols of 1 to 20 carbon atoms, which, in addition to the oxygen atom in the alcohol group, contain at least one further hetero atom and/or contain an aliphatic or aromatic ring, such as 2-ethoxyethyl acrylate, 2-butoxyethyl (meth)acrylate, dimethylaminoethyl (meth)acrylate or diethylaminoethyl (meth)acrylate, aryl, alkaryl or cycloalkyl (meth)acrylates, such as cyclohexyl (meth)acrylate, phenylethyl (meth)acrylate or phenylpropyl (meth)acrylate, and acrylates of heterocyclic alcohols, such as furfuryl (meth)acrylate.

Further auxiliary monomers b) are, for example, (meth)acrylamide, derivatives thereof substituted at the nitrogen by $C_1$–$C_4$-alkyl, and comonomers having hydroxyl functional groups, for example $C_1$–$C_{15}$-alkyl (meth)acrylates which are substituted by one or two hydroxyl groups. $C_1$–$C_8$-Hydroxyalkyl (meth)acrylates, such as hydroxyethyl, hydroxy-n-propyl or hydroxy-n-butyl (meth)acrylate, are particularly important as comonomers having hydroxyl functional groups.

At least one of the two copolymers contains from 3 to 70% by weight, based on the copolymer, of an ethylenically unsaturated $C_3$–$C_5$-mono- or dicarboxylic acid or of the anhydride thereof (monomer c)).

Examples of monomers c) are (meth)acrylic acid, maleic acid, fumaric acid, maleic anhydride, fumaric anhydride or itaconic acid.

The copolymers are prepared by free radical polymerization. Suitable polymerization methods, such as mass, solution, suspension or emulsion polymerization, are known to the skilled worker.

In particular, the copolymers are prepared by solution polymerization with subsequent dispersing in water (secondary dispersion) or preferably by emulsion polymerization.

The copolymers A and B can be prepared separately and then mixed in the desired amounts.

In the case of the emulsion polymerization, the monomers can be polymerized in the conventional manner in the presence of a water-soluble initiator and of an emulsifier at, preferably, from 30° to 95° C.

Examples of suitable initiators are sodium persulfate, potassium persulfate, ammonium persulfate, tert-butyl hydroperoxides, water-soluble azo compounds and redox initiators.

For example, alkali metal salts of relatively long-chain fatty acids, alkylsulfates, alkylsulfonates, alkylated arylsulfonates or alkylated biphenyl ether sulfonates are used as emulsifiers.

Other suitable emulsifiers are reaction products of alkylene oxides, in particular ethylene oxide or propylene oxide, with fatty alcohols, fatty acids or phenol or alkylphenols.

In the case of aqueous secondary dispersions, the copolymers are first prepared by solution polymerization in an organic solvent and are then dispersed in water without the use of an emulsifier or dispersant, with the addition of salt formers, for example of ammonia to carboxyl-containing copolymers. The organic solvent can be distilled off. The preparation of aqueous secondary dispersions is known to the skilled worker and is described in, for example, DE-A-37 20 860.

For adjusting the molecular weight, regulators may be used in the polymerization. For example, —SH-containing compounds, such as mercaptoethanol, mercaptopropanol, thiophenol, thioglycerol, ethyl thioglycolate, methyl thioglycolate, tert-dodecyl mercaptan and mercaptoacetic acid, are suitable.

In a particularly preferred embodiment, the preparation of the copolymers is carried out by first preparing a copolymer which contains from 3 to 70% by weight of monomers c).

The preparation can be carried out, for example, by emulsion polymerization in the aqueous phase or by solution polymerization with subsequent dispersing in water. The monomers of the other copolymer can then be polymerized in the presence of the already prepared copolymer by emulsion polymerization in the aqueous phase.

It has proven particularly useful first to prepare copolymer A).

Copolymer A) therefore preferably consists of from 10 to 97, particularly preferably from 30 to 80, % by weight of the monomers a), from 0 to 50, particularly preferably from 0 to 20, % by weight of the monomers b) and from 3 to 70, particularly preferably from 20 to 70, % by weight of the monomers c).

The monomers of copolymer B) are then polymerized in the presence of the copolymer A). The monomers of copolymer B) can be introduced in the total amount or metered continuously into the initially taken copolymer A). Furthermore, for example, both copolymer A) or parts of copolymer A) and the monomers of copolymer B) can be metered continuously in the same period or different periods into a vessel.

Copolymer B) preferably consists of from 20 to 100, particularly preferably from 50° to 100, % by weight of the monomers a), from 0 to 80, particularly preferably from 0 to 30, % by weight of the monomers b) and from 0 to 30, particularly preferably from 0 to 20, % by weight of the monomers c).

A content of monomers b) in the copolymers A) and B) is in general of minor importance for good block resistance and heat sealability.

In the case of the polymerization of the monomers of copolymers B), the initiators usually used for emulsion polymerizations and regulators may be added (see above). In general, it is not necessary to add an emulsifier since copolymer A) already has an emulsifying effect, owing to the content of monomers c). If desired, however, emulsifiers may be added, for example in amounts of from 0.05 to 3% by weight, based on the sum of the copolymers.

The average molecular weight $M_n$ of the copolymers A) is preferably above 400, in particular from 500 to 80,000, and that of the copolymers B) is preferably from 10,000 to 1,000,000.

The aqueous dispersion obtained preferably has a solids content of from 20 to 70% by weight.

The aqueous dispersion is used for sealable coatings and, for this use, may contain conventional additives, for example wetting agents, thickeners, antifoams or film-forming agents.

For this purpose, the dispersion can first be applied to a substrate, for example printed or unprinted paper, boxboards or polyvinyl chloride, polyethylene terephthalate, polystyrene or polyolefin films. The amount applied (based on solids content) is in general from 1 to 100, preferably from 3 to 40, g per $m^2$ of coated surface.

The coated substrate is then pressed against a further uncoated substrate (heat-sealing or sealing). Examples of suitable uncoated substrates are likewise those mentioned above. By means of heat sealing, articles can be packed by coating, for example, a box-board at points or in zones with the heat-seal adhesive and then pressing it against, for example, the deep-drawn plastics film so that a material to be packed is enclosed.

In heat sealing, the substrates are pressed together by means of sealing jaws. The temperature at the sealing jaws may be from 80° to 250° C., preferably from 100° to 200° C. The contact pressures are in general from 0.1 to 10, in particular from 2 to 6, bar for a contact time of at least 1 second, in general from 2 to 6 seconds.

EXAMPLES

Copolymers A:

The exemplary copolymers A are water-soluble copolymers which were prepared by mass polymerization similarly to the process of DE-A-3 225 876.

For this purpose, 60 parts by weight of styrene and 40 parts by weight of acrylic acid were metered continuously into a 1 l pressure-tight kettle having a downstream pressure tube of twice the capacity and with a pressure controller. The system was heated to 310° C. The pressure was kept at from 5 to 50 bar and was varied in this range once in the course of a minute by periodic pressure regulation. The residence time was 11 minutes; the copolymer melt was discharged at the rate at which fresh monomer mixture was fed in. The copolymer had an average molecular weight $M_n$ of 650 and a molecular weight nonuniformity $U=M_w/M_n-1$ of 1.5. The preparation of the further copolymer A was carried out in a similar manner.

Preparation of the copolymers B in the presence of the copolymers A:

The amount, stated in Table 1, of an aqueous solution of the polymers A was initially taken in a 3 l four-necked flask equipped with a reflux condenser, 2 feed vessels, a thermometer, a pilot stirrer and a gas inlet and gas outlet, the reaction vessel was flushed with nitrogen and said solution was then heated to 85° C. 54 g of a 1.5% strength aqueous sodium persulfate solution were added, and 1,000 g of the monomers of copolymer B) were then run in at 85° C. in the course of 2 hours while stirring. At the same time, in a separate feed, 126 g of a 1.5% strength sodium persulfate solution were added dropwise in 2.5 hours. After the end of the two feeds, the reaction was allowed to continue for a further hour at 85° C. and the mixture was then cooled to room temperature.

The polymer dispersions obtained by this preparation method are coagulum-free. The composition is shown in Table 1.

COMPARATIVE EXAMPLES

|  | V1 | V2 |
|---|---|---|
| tert-Butyl perbenzoate (g) | 7.5 | 6.7 |
| tert-Butyl peroctoate (g) | 4.5 | 6.0 |
| Isobutanol (g) | 150 | 140 |

The composition is shown in Table 1.

The composition is shown in Table 1.

TABLE 1

| | | Composition of the copolymers | | | | | |
|---|---|---|---|---|---|---|---|
| Example No. | Copolymer A [parts by weight] | Monomers of copolymer B [parts by weight] | Ratio A/B (based on SC) | Additives [parts by weight] | Final polymer dispersion pH | Viscosity[4] [mPa.s] | SC |
| 1 | 60 S/40 AA[1] | 80 nBA/20 S | 30/70 | — | 7.8 | 180 | 49.9 |
| 2 | 60 S/40 AA[1] | 80 nBA/20 S | 50/50 | — | 8.2 | 300 | 49.8 |
| 3 | 60 S/40 AA[1] | 80 nBA/20 S | 30/70 | 0.2 t-DmK | 7.5 | 200 | 50.0 |
| 4 | 60 S/40 AA[1] | 80 nBA/20 S | 30/70 | 1 DDPDS | 7.9 | 210 | 50.2 |
| 5 | 60 S/40 AA[1] | 70 nBA/30 MMA | 30/70 | — | 8.1 | 290 | 49.3 |
| 6 | 60 S/40 AA[1] | 70 nBA/30 MMA | 50/50 | — | 7.9 | 240 | 49.7 |
| 7 | 60 S/40 AA[1] | 70 nBA/30 MMA | 30/70 | 0.2 T-DMK | 8.3 | 200 | 49.9 |
| 8 | 60 S/40 AA[1] | 70 nBA/30 MMA | 30/70 | 1 DDPDS | 8.2 | 290 | 50.0 |
| 9 | 51.55/48.5 MMA[2] | 40 nBA/20 EHA/39 S/1 AA | 40/60 | — | 7.9 | 180 | 50.8 |
| 10 | 60 MMA/50 AA[3] | 40 nBA/20 ERA/39 S/1 AA | 40/60 | — | 8.0 | 190 | 49.1 |
| V1 | 57 MMA/36 nBA/7 AA | 51 MMA/49 nBA | 28/72 | — | 7.8 | 250 | 49.3 |
| V2 | 52 MMA/39 nBA/9 AA | 53 MMA/47 nBA | 28/72 | — | 7.9 | 250 | 47.1 |

| SC | pH |
|---|---|
| [1] 35% | 9.0 |
| [2] 40% | 9.8 |
| [3] 40% | 8.7 |

[4] The viscosity was determined according to DIN 53,019

Abbreviations
S:      Styrene
AA:     Acrylic acid
MAA:    Maleic anhydride
MMA:    Methyl methacrylate
nBA:    n-Butyl acrylate
EHA:    2-Ethylhexyl acrylate
t-DMK:  tert-Dodecyl mercaptan
SC:     Solids content
DDPDS:  Na salt of p-dodecyldiphenyl ether disulfonate Comparative Examples 1 and 2 (V1 and V2) correspond to Examples 1 and 2 from DE-A-3 921 256.

In a reaction vessel, mixture 1 was initially taken together with 260 g of isobutanol and was heated to 105° C. Mixture 2 was then added and polymerization was effected in the course of 2.5 hours at the reflux temperature. Mixture 3 was then metered in at about 105° C. in the course of 3 hours. Thereafter, polymerization was continued for 4 hours at 105° C. and the mixture was diluted with 200 g of isobutanol. Following cooling to 60° C., first 35.4 g of 25% strength by weight aqueous ammonia solution and then 850 g of water were stirred in. An isobutanol/water mixture was distilled off under reduced pressure until virtually no further isobutanol passed over. During the distillation, an amount of water corresponding to the amount of liquid distilled off was added.

|  | V1 | V2 |
|---|---|---|
| Mixture 1: | | |
| Methyl methacrylate (g) | 160 | 145 |
| n-Butyl acrylate (g) | 100 | 110 |
| Acrylic acid (g) | 20 | 25 |
| Mixture 2: | | |
| tert-Butyl benzoate (g) | 1.5 | 1.5 |
| tert-Butyl peroctoate (g) | 1.5 | 1.5 |
| Isobutanol (g) | 30 | 30 |
| Mixture 3: | | |
| Methyl methacrylate (g) | 370 | 380 |
| n-Butyl acrylate (g) | 350 | 340 |

Glass transition temperatures of the copolymers

The glass transition temperatures were determined with the aid of differential scanning calorimetry according to ASTM 3418/82. They can also be calculated approximately from the glass transition temperatures of the monomers using the Fox equation (T. G. Fox, Bull. Am. Phys. Soc. Ser. II 1 (1956), 123).

TABLE 2

| Glass transition temperatures in °C. | | |
|---|---|---|
| Example | Copolymer A | Copolymer B |
| 1 | 125 | −26 |
| 2 | 125 | −26 |
| 3 | 125 | −26 |
| 4 | 125 | −26 |
| 5 | 125 | −14 |
| 6 | 125 | −14 |
| 7 | 125 | −14 |
| 8 | 125 | −14 |
| 9 | 100 | −8 |
| 10 | 126 | −8 |
| V1 | 35 | 12 |
| V2 | 30 | 16 |

Testing of performance characteristics

The dispersions were applied with a knife coater (2 mm tooth system) to cardboard (chromoduplex 2 cardboard) in an amount of 7 g of solid per m² and then dried for 3 minutes at 50° C.

Determination of the blocking resistance 3 round samples (d=38 mm) were punched out per adhesive and weight and were placed one on top of the other in such a way that, for each cardboard, coating was in contact with coating and coating was in contact with the back. The samples stacked one on top of the other in this manner were loaded with 1,500 g/cm² for 15 hours at 40° C. After cooling (under load), the evaluation was carried out using ratings from 1 to 5.

Rating 1=Springing apart or noiseless separation of the samples

Rating 2=Cracking noises during separation

Rating 3=Point-like adhesion of the film or cardboard board surface

Rating 4=Extensive adhesion of the film or cardboard board surface

Rating 5=Adhesion over the entire surface

Determination of the heat sealability

The test was carried out 24 hours after preparation of the samples. In a heat-seal apparatus in which only the upper sealing jaw is heated, a PVC film was sealed against the coated side of the cardboard. Here, the cardboard rested against the heated sealing jaw.

Sealing was carried out for 4 seconds at 4 bar, beginning at 130° C., in steps of 10° C. until a complete seal was obtained. The temperature at which the film was firmly sealed was the lowest possible sealing temperature.

| Test | Blocking resistance [Ratings] | | Lowest possible sealing temperature [°C.] | | |
|------|---------------|------------|-----|------|-----|
| | Layer/Layer | Layer/Back | PVC | PETP | PS |
| B 1 | 3 | 2 | 150 | 170 | 180 |
| B 2 | 2 | 1 | 160 | 180 | 190 |
| B 3 | 3 | 2 | 150 | 170 | 180 |
| B 4 | 3 | 2 | 150 | 170 | 180 |
| B 5 | 3 | 2 | 150 | 170 | 180 |
| B 6 | 2 | 1 | 160 | 180 | 190 |
| B 7 | 3 | 2 | 150 | 170 | 180 |
| B 8 | 3 | 2 | 150 | 170 | 180 |
| B 9 | 2 | 1 | 170 | 190 | 200 |
| B 10 | 2 | 1 | 160 | 180 | 190 |
| V 1 | 5 | 3 | 180 | 210 | 220 |
| V 2 | 4-5 | 3 | 190 | 210 | 220 |

The novel Examples show a balance of blocking resistance and lowest possible sealing temperature.

We claim:

1. A process for preparing a heat-sealable substrate, comprising coating said substrate with an aqueous dispersion containing from 5 to 80% by weight of a copolymer A) having a glass transition temperature of from 50° to 150° C. and from 95 to 20% by weight of a copolymer B) having a glass transition temperature of from −50° to +50° C., the glass transition temperatures of the two copolymers differing by at least 5° C., at least one of the two copolymers containing from 3 to 70% by weight, based on the particular copolymer, of an ethylenically unsaturated $C_3$–$C_5$-mono- or dicarboxylic acid or of the anhydride thereof and the stated weights of the copolymers A) and B) being based on the sum of A) and B).

2. The process as claimed in claim 1, wherein the aqueous dispersion has been prepared by carrying out the emulsion polymerization of the monomers of one of the copolymers A) or B) in the aqueous phase in the presence of the other copolymer A) or B) which contains from 3 to 70% by weight of an ethylenically unsaturated $C_3$–$C_5$-mono- or dicarboxylic acid or of the anhydride thereof.

3. The process as claimed in claim 2, wherein the polymerization of the monomers of copolymer B) has been carried out in aqueous emulsion in the presence of copolymer A) which contained from 3 to 70% by weight of an ethylenically unsaturated $C_3$–$C_5$-mono-or dicarboxylic acid or of the anhydride thereof.

* * * * *